US012784603B1

(12) United States Patent
van Dijk

(10) Patent No.: US 12,784,603 B1
(45) Date of Patent: Nov. 3, 2026

(54) CORRELATION OF VISUAL AIR TRAFFIC WITH COOPERATIVE AIR TRAFFIC

(71) Applicant: Daedalean AG, Zurich (CH)

(72) Inventor: Luuk Adriaan Cornelis van Dijk, Bellinzona (CH)

(73) Assignee: Daedalean AG, Zurich (CH)

( * ) Notice: Subject to any disclaimer, the term of this patent is extended or adjusted under 35 U.S.C. 154(b) by 92 days.

(21) Appl. No.: 18/825,471

(22) Filed: Sep. 5, 2024

(51) Int. Cl.
*G08G 5/80* (2025.01)
*G08G 5/72* (2025.01)

(52) U.S. Cl.
CPC ............... *G08G 5/80* (2025.01); *G08G 5/723* (2025.01)

(58) Field of Classification Search
CPC ........ G08G 5/80; G08G 5/723; G06F 3/0641; G06F 16/1748
See application file for complete search history.

(56) References Cited

U.S. PATENT DOCUMENTS

| | | | | |
|---|---|---|---|---|
| 6,799,114 B2 * | 9/2004 | Etnyre | G08G 5/21 701/120 |
| 10,907,940 B1 * | 2/2021 | Parker | F41H 11/02 |
| 2015/0015698 A1 * | 1/2015 | Knight | G08G 5/21 348/115 |
| 2017/0069214 A1 * | 3/2017 | Dupray | G08G 5/56 |

* cited by examiner

*Primary Examiner* — Justin S Lee
(74) *Attorney, Agent, or Firm* — Esplin & Associates, PC

(57) ABSTRACT

Systems and methods to de-duplicate presentations of visual air traffic and cooperative air traffic are disclosed. Exemplary implementations may include obtaining cooperative air traffic information regarding one or more aircraft, obtaining positional information regarding one or more objects, performing normalizations for individual ones of the one or more aircraft and individual ones of the one of more objects, generating presentation information based on the three-dimensional positional information for the one or more aircraft in relation to a position of the first aircraft, adding object presentation information for individual ones of the one of more objects in case no duplicate is indicated through the individual normalizations as performed, presenting the presentation information to the user on a user interface, and/or other steps.

20 Claims, 4 Drawing Sheets

CORRELATION OF VISUAL AIR TRAFFIC WITH COOPERATIVE AIR TRAFFIC

FIELD OF THE DISCLOSURE

The present disclosure relates to systems and methods to correlate visual air traffic with cooperative air traffic, and, more specifically, to de-duplicate presentations of visual air traffic and cooperative air traffic for a given aircraft.

BACKGROUND

Aircraft are known. Cooperative air traffic is known to a given aircraft, e.g., as other airplanes in the air. Visual air traffic is known, e.g., as seen by a pilot of a given aircraft.

SUMMARY

One aspect of the present disclosure relates to a system configured to de-duplicate presentations of visual air traffic and cooperative air traffic for a first aircraft. As used herein, the term "aircraft" is used for both singular and plural, for any machine or device used or usable to navigate, fly, or travel in the air. The first aircraft may be controlled by a user, e.g., a pilot. The system may include one or more physical processors configured by machine-readable instructions. The system may be configured to obtain cooperative air traffic information regarding one or more aircraft, e.g. via one or more of Automatic Dependent Surveillance-Broadcast (ADS-B), Traffic alert and Collision Avoidance System (TCAS), and/or other systems for guidance and/or collision avoidance. The system may be configured to obtain positional information regarding one or more objects. The positional information for an individual object may include an azimuth angle relative to the first aircraft, an elevation angle relative to the first aircraft, and/or other positional information. The system may be configured to perform normalizations for individual ones of the one or more aircraft and individual ones of the one of more objects. An individual normalization may indicate whether an individual object is likely to be a duplicate of an individual aircraft. The system may be configured to generate presentation information based on the three-dimensional positional information for the one or more aircraft in relation to a position of the first aircraft. The system may be configured to add object presentation information for an individual object in case no duplicate is indicated for that individual object through the individual normalizations as performed. The system may be configured to present the presentation information to the user on a user interface, and/or perform other steps.

Another aspect of the present disclosure relates to a method of de-duplicating presentations of visual air traffic and cooperative air traffic for a first aircraft. The method may include obtaining cooperative air traffic information regarding one or more aircraft. The method may include obtaining positional information regarding one or more objects. The method may include performing normalizations for individual ones of the one or more aircraft and individual ones of the one of more objects. The method may include generating presentation information based on the three-dimensional positional information for the one or more aircraft in relation to a position of the first aircraft. The method may include adding object presentation information for individual ones of the one of more objects in case no duplicate is indicated through the individual normalizations as performed. The method may include presenting the presentation information to the user on a user interface. The method may include additional steps.

As used herein, any association (or relation, or reflection, or indication, or correspondency, or correlation) involving aircraft, objects, cameras, sensors, positional information, antennas, servers, processors, client computing platforms, users, output signals, events, locations, instructions, identifiers, presentations, notifications, determinations, interfaces, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
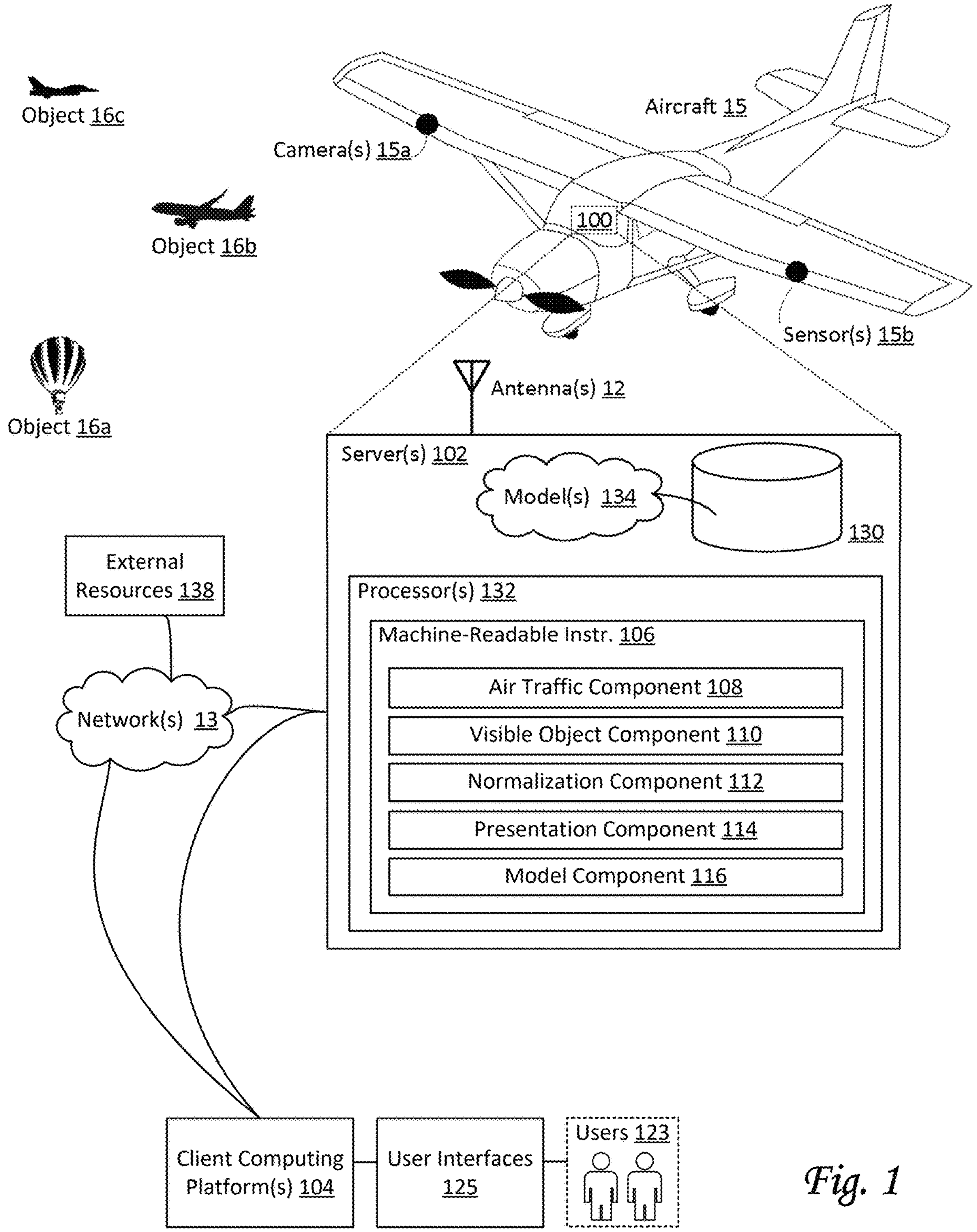
FIG. 1 illustrates a system configured to de-duplicate presentations of visual air traffic and cooperative air traffic, in accordance with one or more implementations.

FIG. 1 illustrates a system 100 configured to de-duplicate presentations of visual air traffic and cooperative air traffic, e.g., for a particular aircraft 15, in accordance with one or more implementations. De-duplication prevents information regarding the same aircraft or object be presented to a user, e.g., a pilot, more than once. System 100 may include one or more of server(s) 102, processor(s) 132, electronic storage 130, antenna(s) 12, client computing platform(s) 104, user interface(s) 125, and/or other components. System 100 may be included in, carried by, and/or integrated in aircraft 15. An individual instance of system 100 may be specific to an individual aircraft, e.g., aircraft 15. In some cases, system 100 may include this aircraft 15. By virtue of the features described in this disclosure, positional information regarding airborne objects, in particular aircraft, may be normalized and/or de-duplicated prior to being presented to users. As used herein, positional information may refer to geographical locations. As used herein, the term "normalize" refers to the concept of organizing, analyzing, and cleaning information to increase efficiency for usage and sharing. In other words, redundancy is removed from this information when the information for two or more objects or aircraft is resolved and/or otherwise collapsed into just one object or aircraft. Users 123 (also referred to as users) may include one or more of a first user, a second user, a third user, and/or other users. As used in descriptions herein, any use of the term "user" may refer to user(s) 123, unless indicated otherwise.

In some implementations, server(s) 102 may be configured to communicate with one or more client computing platforms 104 according to a client/server architecture and/or other architectures. In some implementations, client computing platform(s) 104 may be configured to communicate with other client computing platforms via server(s) 102, wherein the communication uses a peer-to-peer architecture and/or other architectures. Users may access system 100 via client computing platform(s) 104. In some implementations, system 100 and/or components thereof may be configured to communicate with one or more of users 123, and/or other entities and/or components, e.g., through one or more networks 13.

Server(s) 102 may include electronic storage 130, (hardware) processor(s) 132, machine-readable instructions 106, and/or other components. Server(s) 102 may be configured by machine-readable instructions 106. Machine-readable instructions 106 may include one or more instruction components. Instruction components (for any set of machine-readable instructions) may include computer program components. The instruction components may include one or more of an air traffic component 108, a visible object component 110, a normalization component 112, a presentation component 114, a model component 116, and/or other instruction components.

Aircraft 15 may include one or more antenna(s) 12, sensor(s) **15*b*, camera(s) 15*a*, and/or other components. Antenna(s) 12 may be configured to receive and/or transmit signals, including but not limited to radar signals, communication signals, and/or other signals. Sensors 15*b* may include one or more of an altimeter, an airspeed sensor, a compass, an image sensor, etc. Sensor(s) 15*b* may be configured to capture sensor information, e.g., pertaining to surroundings of aircraft 15. Sensor(s) 15*b* may be carried by aircraft 15. Image sensors, e.g., cameras, may be configured to capture, record, and/or convey image information such as still imagery and/or video imagery, which may be sensitive to visible parts of the electromagnetic spectrum and/or invisible parts of the electromagnetic spectrum (e.g., infrared, ultraviolet), and/or other energy (e.g., pressure waves). The image information may characterize and/or define images, including but not limited to graphical and/or visual imagery. Cameras 15*a* may include one or more discrete camera or sensor elements. Cameras 15*a* may be configured to have overlapping fields of view covering 360 degrees around aircraft 15**.

Aircraft 15 and/or system 100 may obtain, receive, and/or generate information regarding other aircraft (e.g., during active flight), Automatic Dependent Surveillance-Broadcast (ADS-B) information (In and/or Out), radar and/or flight alarm (FLARM) information, Traffic Alert and Collision Avoidance System (TCAS) information, lowest selectable speed (VLS) information, instrument read-out information (e.g., altimeter, airspeed, compass, etc.), positional information, timing information, aircraft identification, altitude, heading, bearing, orientation, velocity, and/or other information related to aircraft 15 and/or its surroundings.

Air traffic component 108 may be configured to obtain and/or receive information. The information may include cooperative air traffic information regarding one or more aircraft, particularly aircraft in flight. The cooperative air traffic information may include positional information regarding aircraft, such as, e.g., three-dimensional positional information, which may include absolute coordinates referring to a world frame. In some implementations, air traffic component 108 may obtain and/or receive information in an ongoing manner, e.g., continually, continuously, and/or at intervals. In some implementations, cooperative air traffic information is obtained from Automatic Dependent Surveillance-Broadcast (ADS-B). Alternatively, and/or simultaneously, cooperative air traffic information may be obtained from Traffic alert and Collision Avoidance System (TCAS).

Visible object component 110 may be configured to obtain, receive, determine, and/or generate information regarding objects, particularly airborne objects. For example, the objects may include an object/aircraft **16*a*, an object/aircraft 16*b*, an object/aircraft 16*c*, and/or other objects as depicted in FIG. 1. Objects may include airplanes, helicopters, birds, parachutes, balloons, and/or other airborne objects, particularly moving objects. Some objects may be aircraft, but others are not. The obtained, received, determined, and/or generated information may include positional information. In some implementations, the positional information may be based on sensor information and/or image information captured by sensor(s) 15*b*, camera(s) 15*a*, and/or other components carried by aircraft 15. In some implementations, visible object component 110 may be configured to detect objects based on sensor information and/or image information. The positional information for a detected object may include an azimuth angle and an elevation angle relative to aircraft 15, e.g. in degrees. Upon detection, in some cases, a (slant) range or distance for a detected object may not be available. Upon classification of a detected object, a (slant) range or distance may be determined and/or estimated, based at least in part on the determined and/or estimated size of the detected object. In some implementations, object detection may be performed using one or more machine learning models 134, which may include a neural network. In some implementations, object classification may be performed using machine learning model(s) 134. By way of non-limiting example, object classification may indicate the type of aircraft, such as fixed-wing, prop, jet, helicopter, military craft, specific make and model, etc. In some implementations, determination of (slant) range and/or distance may be performed using machine learning model(s) 134**. In some cases, visually detected airborne objects are referred to as intruders.

Normalization component 112 may be configured to perform normalizations of aircraft and/or detected objects. For example, normalization component 112 may perform a normalization that indicates whether a particular aircraft (e.g., an aircraft for which air traffic component 108 has obtained and/or received information including positional information) and a particular object (e.g., as detected by visible object component 110) are likely to be duplicates, or, in other words, one and the same. Normalization component 112 may convert positional information from a local frame of reference (of aircraft 15) to another frame of reference (e.g., absolute coordinates in a world frame), and/or vice versa, such that these different types of positional information can be compared. Normalizations may be based on comparing position, heading, speed, and/or other information for aircraft and/or detected objects. For example, particular cooperative air traffic information for a particular aircraft may indicate a specific type of passenger jet. Object classification for an object at or near the same position may indicate a similar type of passenger jet, thus increasing the likeliness these are duplicates. Alternately, an object classification indicating a helicopter would have decreased the likeliness these are duplicates.

For example, assume a particular detected object **16*a* has a particular azimuth angle and a particular elevation angle relative to aircraft 15. Assume a particular object/aircraft 16*b* has particular absolute coordinates. Based on the position of aircraft 15, these particular absolute coordinates can be converted to an expected azimuth angle, an expected elevation angle, and an expected range for particular aircraft 16*b*, relative to aircraft 15. Normalization may be based on comparing the particular azimuth angle and the particular elevation angle of a particular detected object with the expected azimuth angle and the expected elevation angle of a particular aircraft. For example, if these angles are within a certain amount of degrees of each other, normalization component 112** may determine this particular detected object and this particular aircraft are likely to be duplicates of each other, or, in other words, are likely to be one and the same.

As another example, assume a particular detected object **16*a* has a particular azimuth angle and a particular elevation angle relative to aircraft 15. Assume a particular aircraft 16*b* has particular absolute coordinates. Based on the position of aircraft 15, the particular azimuth angle and the particular elevation angle of particular detected object 16*a* can be converted to a set of potential absolute coordinates. In particular, this set of potential absolute coordinates forms a ray extending outward from the position of aircraft 15. Normalization may be based on comparing the set of potential absolute coordinates of particular detected object 16*a* with the absolute coordinates of particular aircraft 16*b*. For example, if these coordinates are within a certain (minimum) distance of each other, normalization component 112 may determine this particular detected object 16*a* and this particular aircraft 16*b* are likely to be duplicates of each other, or, in other words, are likely to be one and the same. The use of other frames of reference and/or other coordinate systems is envisioned within the scope of this disclosure. For example, in some cases, the positional information of both a particular detected object 16*a* and a particular aircraft 16*b* may be converted prior to normalization component 112** performing a normalization.

In some implementations, normalization component 112 may be configured to perform de-duplications for information pertaining to aircraft and detected objects. In some implementations, normalization component 112 may be configured to reduce redundancy regarding information pertaining to aircraft and detected objects. In some implementations, normalization component 112 may be configured to resolve information pertaining to an aircraft and a detected object as actually (or probably) being a single aircraft or object. In some implementations, normalization component 112 may be configured to correlate information pertaining to aircraft and detected objects. In some implementations, normalization component 112 may be configured to reassess a previously-performed normalization, e.g., subsequent to obtaining and/or determining additional information regarding a previously-detected airborne object, such as its (slant) range. In some cases, a previous normalization indicating two objects/aircraft are not duplicates may now be determined to be duplicates. Alternately, a previous normalization indicating two objects/aircraft are duplicates may now be determined to not be duplicates. Responsive to such reassessments or renewed normalizations, presentation information (by presentation component 114) may be generated and/or modified.

Presentation component 114 may be configured to generate presentation information and present the presentation information, e.g., on a user interface to a user (of aircraft 15). Presentation information may be generated based on (three-dimensional) positional information for aircraft (as well as speed, heading, expected current position, and/or other relevant information) in relation to a position of aircraft 15. In some implementations, presentation information may reflect the dynamic position as a function of time of various aircraft due to movement of the various aircraft, including but not limited to aircraft 15. In some cases, the generated presentation information is formatted to be presented on a two-dimensional display, including but not limited to a Horizontal Situation Indicator (HSI). For example, three-dimensional information may be projected to two dimensions. In some cases, e.g., for an HSI, the azimuth angle and elevation angle for an aircraft are converted to a world frame bearing (e.g., relative to the nose of the aircraft) and world frame elevation.

Figure 4A:
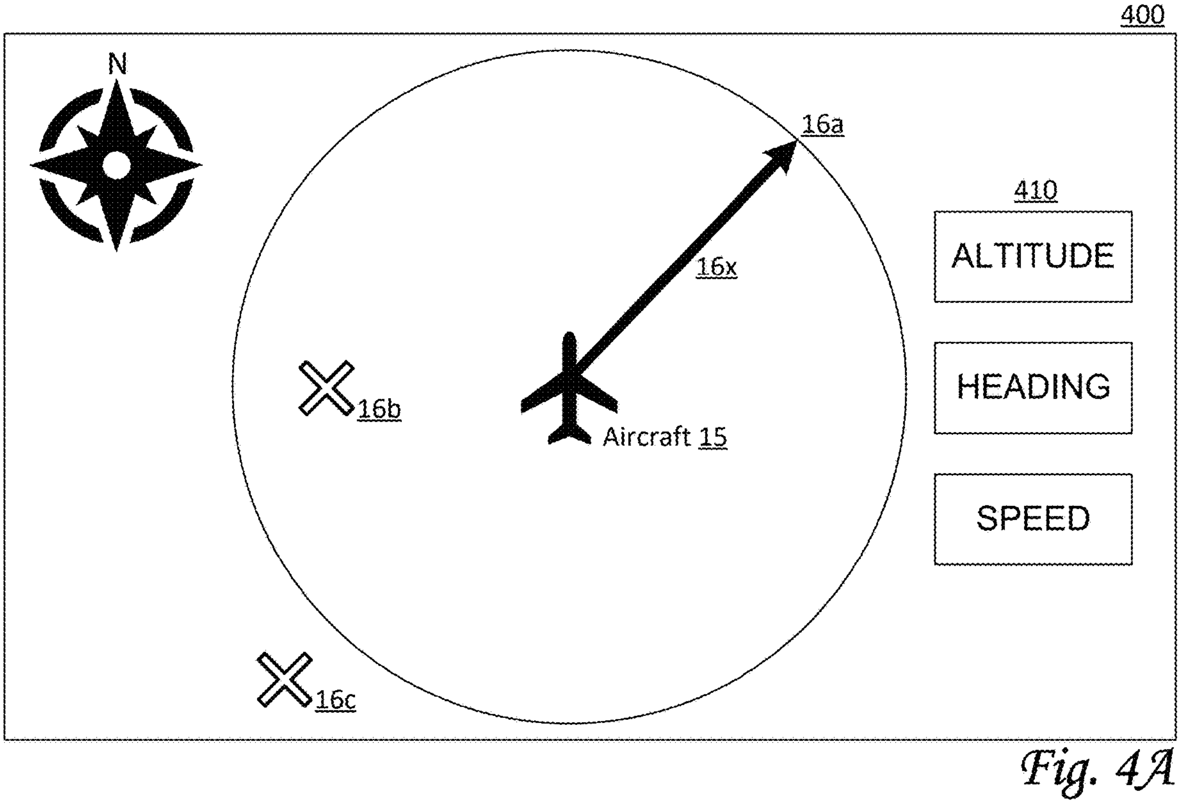
FIG. 4A illustrates an exemplary user interface as may be used in a system configured to de-duplicate presentations of visual air traffic and cooperative air traffic, in accordance with one or more implementations.

Presentation component 114 may be configured to add to or modify previously-generated presentation information for certain detected airborne objects. For example, responsive to one or more normalizations (by normalization component 112) indicating that a particular detected airborne object is (likely) not a duplicate of any of the aircraft for which cooperative air traffic information has been obtained, object-specific presentation information for this particular detected airborne object may be generated, added to existing presentation information, and presented to a user. This object-specific presentation information (also referred to as object presentation information) may be based on the azimuth angle and the elevation angle of this particular detected airborne object, without knowing or using the distance of this particular detected airborne object to aircraft 15. In some implementations, the object-specific presentation information may be depicted as a ray extending (radially) outward from the position of aircraft 15. By way of non-limiting example, FIG. 4A illustrates an exemplary user interface 400 as may be used in system 100, depicting aircraft 15 in the center of a circle, a compass in the top corner, and information elements 410 depicting relevant information regarding aircraft 15. Indicators indicate the position, including distance, of aircraft **16*b* and aircraft 16*c* relative to aircraft 15. For object 16*a*, a ray 16*x* is depicted, indicating at least the azimuth angle, and possibly the elevation angle, of object 16*a*. In some cases, the depiction of object 16*a* in user interface 400 may indicate whether object 16*a* is at a higher elevation than aircraft 15, or at a lower elevation than aircraft 15**.

Alternatively, in some implementations, presentation information may be generated for any of the aircraft for which cooperative air traffic information has been obtained, plus for any of the detected airborne objects. Subsequently, this presentation information may be modified by removing those detected airborne objects (and their associated information such as rays) that have been determined to be duplicates of any of the aircraft for which cooperative air traffic information has been obtained.

Figure 4B:
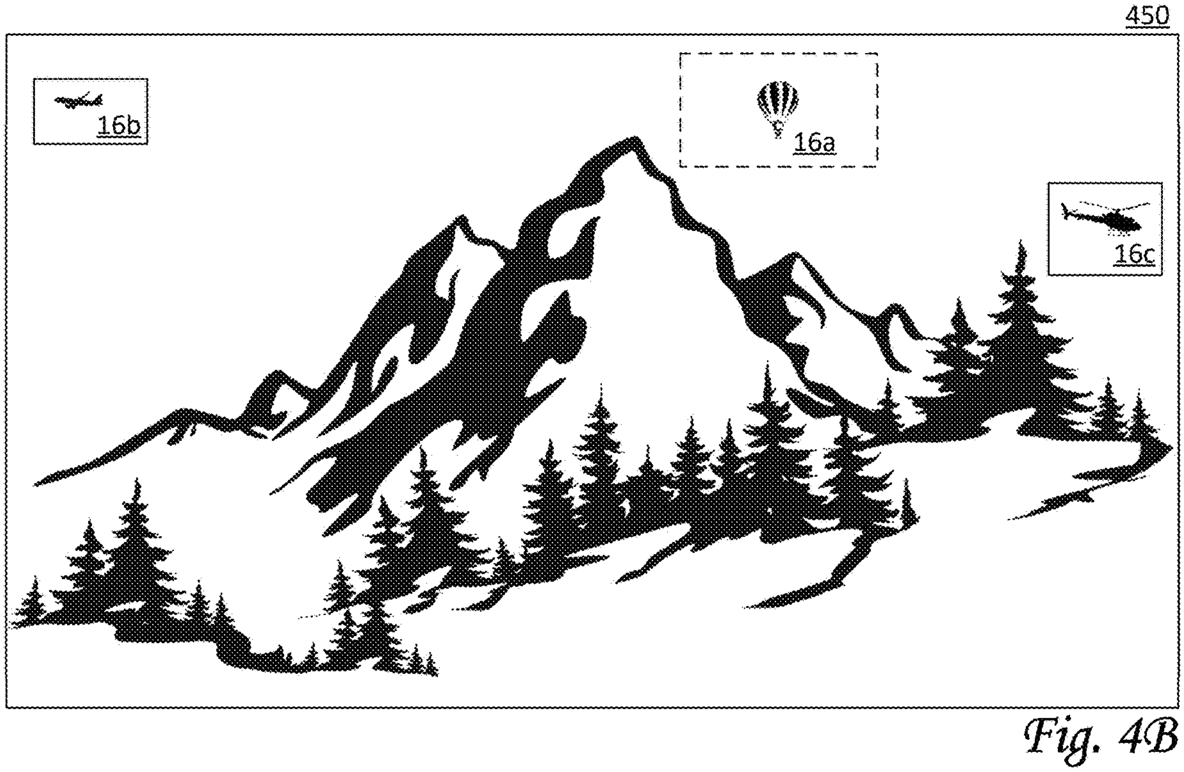
FIG. 4B illustrates an exemplary user interface as may be used in a system configured to present visual air traffic and cooperative air traffic, in accordance with one or more implementations.

In some implementations, presentation component 114 may be configured to generate and present presentation information for detected airborne objects in a manner such that the presentation information for an object that is (likely to be) a duplicate of an aircraft is visually distinct from other detected airborne objects and/or from other aircraft (without duplicates). By way of non-limiting example, FIG. 4B illustrates an exemplary user interface 450 as may be used in system 100, e.g., for a Head-Up Display (HUD), or a (three-dimensional) projection for the user of aircraft 15. User interface 450 may depict surroundings of aircraft 15, including object 16*a*, aircraft 16*b*, and aircraft 16*c*, each of which is accompanied by a graphical user interface element (as depicted here, a bounding box). As depicted, the style of the bounding box (using solid vs dashed lines) may distinguish aircraft with duplicates (such as aircraft 16*b* and aircraft 16*c*) from object 16*a* which is not a duplicate.

Referring to FIG. 1, model component 116 may be configured to use and/or interact with machine learning model(s) 134, which may include a neural network. Model component 116 may provide prompts, context, and/or other information as input to machine learning model(s) 134. Model component 116 may obtain and/or receive information as output from machine learning model(s) 134. In some implementations, model component 116 may provide image information, as captured by cameras 15*a*, as input to machine learning model 134(*s*) for detection of airborne objects, classification of airborne objects, range determination for airborne objects, and/or other tasks to be performed by machine learning model 134(*s*).

In some implementations, aircraft 15 may support autonomous flight control. Alternatively, and/or simultaneously, in some cases, aircraft 15 may support pilot assistance, in particular non-autonomous pilot assistance or, in other words, assisted flight control.

In some implementations, aircraft 15 may be configured to present interfaces (e.g., user interfaces 125) to users, e.g., through client computing platforms 104 associated with the respective users. Presentations of user interfaces to users may include determined positional and/or geographical information (and/or information derived therefrom), e.g., as determined by system 100. In some cases, aircraft 15 may recommend an action based on a determination, e.g., to evade a particular detected airborne object.

Referring to FIG. 1, user interfaces 125 may be configured to facilitate interaction between users 123, system 100, and aircraft 15, and/or between users 123 and client computing platforms 104. For example, user interfaces 125 may provide an interface through which users 123 may provide information to and/or receive information from system 100 and/or aircraft 15. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100.

Referring to FIG. 1, in some implementations, aircraft 15, system 100, client computing platform(s) 104, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes operative linking via some other communication media.

A given client computing platform 104 may include one or more processors configured to execute computer program components. The computer program components may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 138 may include sources of information outside of system 100, external entities participating with system 100, external providers of computation and/or storage services (e.g., a server external to system 100), external providers of relevant information (e.g., flight scheduling information, weather information, etc.), and/or other resources. In some implementations, some or all of the functionality attributed herein to external resources 138 may be provided by resources included in system 100. In some implementations, one or more external resources 138 may provide information to other components of system 100. In some cases, systems that provide or aid with Automatic Dependent Surveillance-Broadcast (ADS-B) and/or Traffic alert and Collision Avoidance System (TCAS) may be considered as external resources 138.

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together.

Electronic storage 130 may comprise non-transitory storage media that electronically stores information. The electronic storage media may include one or both of system storage that is provided integrally (i.e., substantially non-removable) with a corresponding server and/or removable storage that is removably connectable to the corresponding server via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by corresponding processor(s), information received from corresponding server(s), information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, and/or 116, and/or other components. Processor(s) 132 may be configured to execute components 108, 110, 112, 114, and/or 116, and/or other components by software; hardware; firmware; some combination of software, hardware, and/or firmware; and/or other mechanisms for configuring processing capabilities on processor(s) 132. As used herein, the term “component” may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within two separate processing units, this is exemplary. In implementations in which processor(s) 132 and/or processor(s) 132 include multiple processing units, one or more of components 108, 110, 112, 114, and/or 116 may be implemented remotely from the other components. The description of the functionality provided by the different components 108, 110, 112, 114, and/or 116 described below is for illustrative purposes only, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 132 may be configured to execute one or more additional components that may perform some or all of the functionality attributed below to one of components 108, 110, 112, 114, and/or 116.

Figure 2:
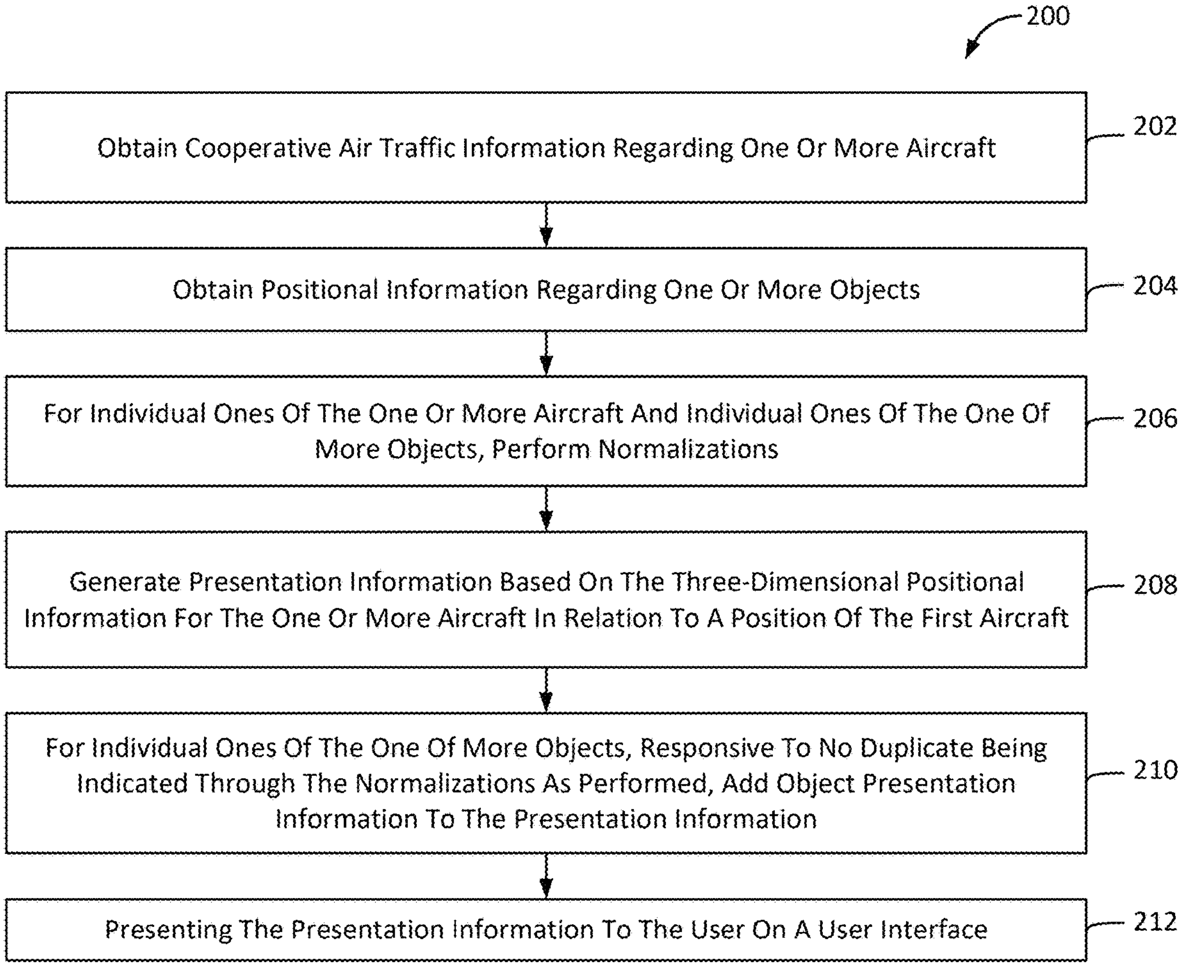
FIG. 2 illustrates a method of de-duplicating presentations of visual air traffic and cooperative air traffic, in accordance with one or more implementations.
Figure 3:
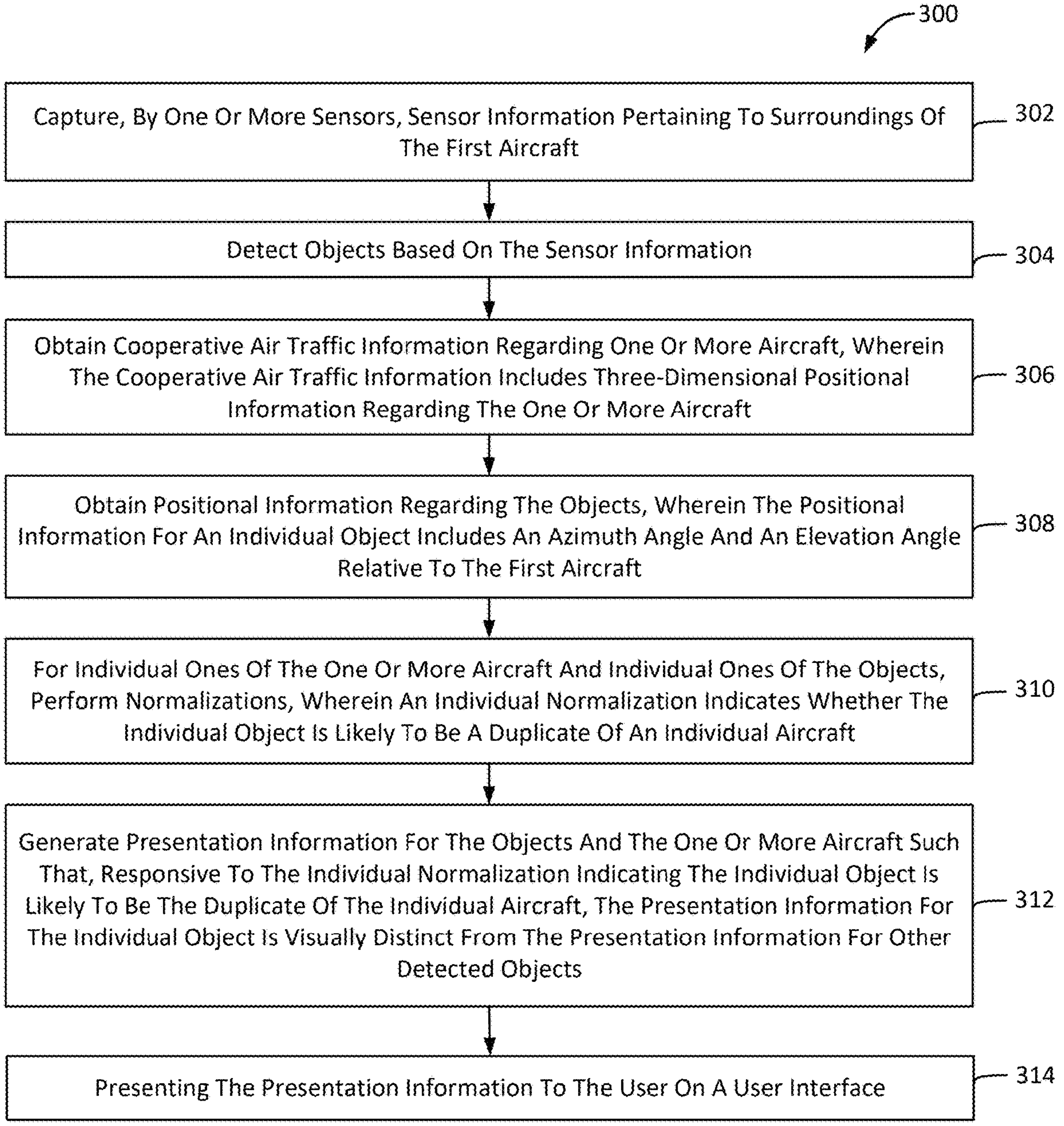
FIG. 3 illustrates a method of presenting both visual air traffic and cooperative air traffic, in accordance with one or more implementations.

FIG. 2 and FIG. 3 illustrate a method 200 and a method 300 of de-duplicating presentations of visual air traffic and cooperative air traffic or of presenting visual air traffic and cooperative air traffic, wherein the first aircraft includes a first receiver, in accordance with one or more implementations. The operations of method 200 and method 300 presented below are intended to be illustrative. In some implementations, method 200 and/or method 300 may be accomplished with one or more additional operations not described, and/or without one or more of the operations discussed. Additionally, the order in which the operations of method 200 are illustrated in FIG. 2 and described below is not intended to be limiting. The order in which the operations of method 300 are illustrated in FIG. 3 and described below is not intended to be limiting.

In some implementations, method 200 and/or method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 and/or method 300 in response to instructions stored electronically on an electronic storage medium. The one or more processing devices may include one or more devices configured through hardware, firmware, and/or software to be specifically designed for execution of one or more of the operations of method 200 and/or method 300.

Regarding method 200, at an operation 202, cooperative air traffic information regarding one or more aircraft is obtained, in an ongoing manner. The cooperative air traffic information includes three-dimensional positional information regarding the one or more aircraft. In some embodiments, operation 202 is performed by an air traffic component the same as or similar to air traffic component 108 (shown in FIG. 1 and described herein).

At an operation 204, positional information regarding one or more objects is obtained, in an ongoing manner. The positional information for an individual one of the one or more objects includes an azimuth angle and an elevation angle relative to the first aircraft. In some embodiments, operation 204 is performed by a visible object component the same as or similar to visible object component 110 (shown in FIG. 1 and described herein).

At an operation 206, for individual ones of the one or more aircraft and individual ones of the one of more objects, normalizations are performed. An individual normalization indicates whether an individual one of the one or more objects is likely to be a duplicate of an individual one of the one or more aircraft. In some embodiments, operation 206 is performed by a normalization component the same as or similar to normalization component 112 (shown in FIG. 1 and described herein).

At an operation 208, presentation information is generated based on the three-dimensional positional information for the one or more aircraft in relation to a position of the first aircraft. In some embodiments, operation 208 is performed by a presentation component the same as or similar to presentation component 114 (shown in FIG. 1 and described herein).

At an operation 210, for individual ones of the one of more objects, responsive to no duplicate being indicated through the normalizations as performed, object presentation information is added to the presentation information. The object presentation information for the individual one of the one or more objects is based on the azimuth angle and the elevation angle. In some embodiments, operation 210 is performed by a presentation component the same as or similar to presentation component 114 (shown in FIG. 1 and described herein).

At an operation 212, the presentation information is presented to the user on a user interface. In some embodiments, operation 212 is performed by a presentation component the same as or similar to presentation component 114 (shown in FIG. 1 and described herein).

Regarding method 300, at an operation 302, sensor information is captured, by one or more sensors, pertaining to surroundings of the first aircraft. In some embodiments, operation 302 is performed by one or more sensors and/or cameras the same as or similar to sensor(s) **15*b* and/or camera(s) 15*a* (shown in FIG. 1** and described herein).

At an operation 304, objects are detected based on the sensor information. In some embodiments, operation 304 is performed by a visible object component and/or a model component the same as or similar to visible object component 110 and/or model component 116 (shown in FIG. 1 and described herein).

At an operation 306, cooperative air traffic information regarding one or more aircraft is obtained, in an ongoing manner. The cooperative air traffic information includes three-dimensional positional information regarding the one or more aircraft. In some embodiments, operation 306 is performed by an air traffic component the same as or similar to air traffic component 108 (shown in FIG. 1 and described herein).

At an operation 308, positional information regarding the objects is obtained, in an ongoing manner. The positional information for an individual object includes an azimuth angle and an elevation angle relative to the first aircraft. In some embodiments, operation 308 is performed by a visible object component the same as or similar to visible object component 110 (shown in FIG. 1 and described herein).

At an operation 310, normalizations are performed for individual ones of the one or more aircraft and individual ones of the objects. An individual normalization indicates whether the individual object is likely to be a duplicate of an individual aircraft. In some embodiments, operation 310 is performed by a normalization component the same as or similar to normalization component 112 (shown in FIG. 1 and described herein).

At an operation 312, presentation information is generated for the objects and the one or more aircraft such that, responsive to the individual normalization indicating the individual object is likely to be the duplicate of the individual aircraft, the presentation information for the individual object is visually distinct from the presentation information for other detected objects. In some embodiments, operation 312 is performed by a presentation component the same as or similar to presentation component 114 (shown in FIG. 1 and described herein).

At an operation 314, the presentation information is presented to the user, e.g., on a user interface. In some embodiments, operation 314 is performed by a presentation component the same as or similar to presentation component 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured to de-duplicate presentations of visual air traffic and cooperative air traffic for a first aircraft, wherein the first aircraft is being controlled by a user, the system comprising:

one or more sensors, carried by the first aircraft, configured to capture sensor information pertaining to surroundings of the first aircraft;

one or more physical processors configured by machine-readable instructions to:

obtain, in an ongoing manner, cooperative air traffic information rewarding one or more aircraft, wherein the cooperative air traffic information includes three-dimensional positional information rewarding the one or more aircraft;

detect one or more objects, wherein the one or more objects are graphically identified obiects, wherein the detection is performed using a neural network configured to graphically identify objects, wherein the sensor information as captured acts as input to the neural network;

determine, in an ongoing manner based on the sensor information, positional information rewarding the one or more objects, wherein the positional information for an individual one of the one or more objects includes an azimuth angle and an elevation angle relative to the first aircraft;

for individual ones of the one or more aircraft and individual ones of the one or more objects, perform normalizations based on the cooperative air traffic information and the positional information, wherein an individual normalization indicates whether an individual one of the one or more objects is likely to be a duplicate of an individual one of the one or more aircraft;

generate presentation information based on the three-dimensional positional information for the one or more aircraft in relation to a position of the first aircraft;

for individual ones of the one or more objects, responsive to no duplicate being indicated through the normalizations as performed, add object presentation information to the presentation information, wherein the object presentation information for the individual one of the one or more objects is based on the azimuth angle and the elevation angle;

present the presentation information to the user on a user interface.

2. The system of claim 1, wherein the cooperative air traffic information is obtained from one or both of Automatic Dependent Surveillance-Broadcast (ADS-B) and/or Traffic alert and Collision Avoidance System (TCAS), and wherein the three-dimensional positional information includes absolute coordinates.

3. The system of claim 1, wherein the one or more sensors include one or more image sensors, and wherein the sensor information as captured includes image information.

4. The system of claim 3, wherein the one or more image sensors include multiple cameras having overlapping fields of view covering 360 degrees around the first aircraft.

5. The system of claim 1, wherein the one or more physical processors are further configured to:

generate the positional information regarding the one or more objects.

6. The system of claim 1, wherein the one or more physical processors are further configured to:

for a given object that has been detected and that has a given azimuth angle and a given elevation angle, determine a given range of the individual object from the first aircraft;

perform a reassessment of an individual normalization for the individual object based on the given azimuth angle, the given elevation angle, and the given range;

modify the presentation information based on the reassessment; and present the presentation information as modified to the user on the user interface.

7. The system of claim 1, wherein the one or more sensors include one or more cameras configured to capture image information conveying imagery, wherein the one or more physical processors are further configured such that the image information as captured is used to generate and provide input to the neural network, and wherein output from the neural network conveys the positional information and distance for the one or more objects.

8. The system of claim 1, wherein adding the object presentation information comprises depicting the object-specific presentation information on the user interface as a radial ray extending outward from a position representing the first aircraft, without depicting a specific distance of the individual object to the first aircraft.

9. The system of claim 1, wherein presenting the presentation information on the user interface comprises displaying a graphical bounding box around each detected object and cooperative aircraft, and wherein a line style of the bounding box is varied to visually distinguish objects indicated as duplicates from objects indicated as non-duplicates.

10. A method of de-duplicating presentations of visual air traffic and cooperative air traffic for a first aircraft, wherein the first aircraft is being controlled by a user, the method comprising:

capturing, by one or more sensors carried by the first aircraft, sensor information pertaining to surroundings of the first aircraft;

obtaining, in an ongoing manner, cooperative air traffic information rewarding one or more aircraft, wherein the cooperative air traffic information includes three-dimensional positional information rewarding the one or more aircraft;

detecting one or more objects, wherein the one or more objects are graphically identified objects, wherein the detection is performed using a neural network, wherein the sensor information as captured acts as input to the neural network;

determining, in an ongoing manner based on the sensor information, positional information rewarding the one or more objects, wherein the positional information for an individual one of the one or more objects includes an azimuth angle and an elevation angle relative to the first aircraft;

for individual ones of the one or more aircraft and individual ones of the one or more objects, performing normalizations based on the cooperative air traffic information and the positional information, wherein an individual normalization indicates whether an individual one of the one or more objects is likely to be a duplicate of an individual one of the one or more aircraft;

generating presentation information based on the three-dimensional positional information for the one or more aircraft in relation to a position of the first aircraft; and for individual ones of the one or more objects, responsive to no duplicate being indicated through the normalizations as performed, adding object presentation information to the presentation information, wherein the object presentation information for the individual one of the one or more objects is based on the azimuth angle and the elevation angle; and presenting the presentation information to the user on a user interface.

11. The method of claim 10, wherein the cooperative air traffic information is obtained from one or both of Automatic Dependent Surveillance-Broadcast (ADS-B) and/or Traffic alert and Collision Avoidance System (TCAS), and wherein the three-dimensional positional information includes absolute coordinates.

12. The method of claim 10, wherein the one or more sensors include one or more image sensors, and wherein the sensor information as captured includes image information.

13. The method of claim 12, wherein the one or more image sensors include multiple cameras having overlapping fields of view covering 360 degrees around the first aircraft.

14. The method of claim 10, further comprising:

generating the positional information regarding the one or more objects.

15. The method of claim 10, further comprising:

for a given object that has been detected and that has a given azimuth angle and a given elevation angle, determining a given range of the individual object from the first aircraft;

performing a reassessment of an individual normalization for the individual object based on the given azimuth angle, the given elevation angle, and the given range;

modifying the presentation information based on the reassessment; and presenting the presentation information as modified to the user on the user interface.

16. The method of claim 10, wherein adding the object presentation information comprises depicting the object-specific presentation information on the user interface as a radial ray extending outward from a position representing the first aircraft, without depicting a specific distance of the individual object to the first aircraft.

17. The method of claim 10, wherein presenting the presentation information on the user interface comprises displaying a graphical bounding box around each detected object and cooperative aircraft, and wherein a line style of the bounding box is varied to visually distinguish objects indicated as duplicates from objects indicated as non-duplicates.

18. A method of presenting visual air traffic and cooperative air traffic for a first aircraft, wherein the first aircraft is being controlled by a user, the method comprising:

capturing, by one or more sensors carried by the first aircraft, sensor information pertaining to surroundings of the first aircraft;

detecting objects based on the sensor information;

obtaining, in an ongoing manner, cooperative air traffic information regarding one or more aircraft, wherein the cooperative air traffic information includes three-dimensional positional information regarding the one or more aircraft;

determining, in an ongoing manner based on the sensor information, positional information regarding the objects, wherein the positional information for an individual object includes an azimuth angle and an elevation angle relative to the first aircraft;

for individual ones of the one or more aircraft and individual ones of the objects, performing normalizations, wherein an individual normalization indicates whether the individual object is likely to be a duplicate of an individual aircraft;

generating presentation information for the objects and the one or more aircraft such that, responsive to the individual normalization indicating the individual object is likely to be the duplicate of the individual aircraft, the presentation information for the individual object is visually distinct from the presentation information for other detected objects; and presenting the presentation information to the user on a user interface.

19. The method of claim 18, further comprising:

subsequent to performing an initial normalization:

determining a range of an individual object;

performing a reassessment of the initial normalization for the individual object based on the determined range; and modifying the presentation information based on the reassessment.

20. The method of claim 18, wherein presenting the presentation information on the user interface comprises displaying a graphical bounding box around each detected object and cooperative aircraft, and wherein a line style of the bounding box is varied to visually distinguish objects indicated as duplicates from objects indicated as non-duplicates.

* * * * *